United States Patent Office 2,993,934
Patented July 25, 1961

2,993,934
DERIVATIVES OF PENTACHLOROPHENOL

Irving Rosen, Painesville, Ohio, assignor to Diamond Alkali Company, Cleveland, Ohio, a corporation of Delaware
No Drawing. Filed Aug. 8, 1956, Ser. No. 602,902
1 Claim. (Cl. 260—612)

This invention relates to new chemical compounds, compositions containing such compounds, and to methods for their use.

The novel compounds of this invention are derivatives of pentahalophenol and are esters, ethers and salts thereof. These novel compounds are represented by the general structural formula represented below:

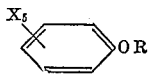

In the structural formula, X is halogen and R is selected from the group consisting of carbamyls substituted aryl carboxy, aryl sulfonates, aryl phosphates, alkynyl, —H·$R_1$, where $R_1$ is selected from the groups consisting of monohydroxy alkyl amines and N-containing heterocyclics.

The novel compounds of this invention are prepared generally by a process comprising the step of reacting a pentahalophenol, of which pentachlorophenol is exemplary, with compounds containing the R groups presented in the general formula above. The preparation of the esters is carried out in an organic solvent, for example, pyridine, while an oxygenated organic compound such as an alcohol or methyl ethyl ketone is used with the derivatives of pentachlorophenol which result in salts thereof; an additional organic solvent is a hydrocarbon and is used in the reaction of the pentachlorophenol with the N-containing heterocyclics. Since the compound pentachlorophenol is well known in the art and since it can be obtained commercially, it is considered unnecessary to describe its preparation.

Exemplary of the compounds derived from pentachlorophenol where R is selected from the group consisting of carbamates is pentachlorophenyldimethylcarbamate; where R is derived from substituted aryl carboxy groups, the compounds are pentachlorophenyl-p-nitrobenzoate and pentachlorophenyl-p-chlorobenzoate. Where R is an aryl sulfonate and phosphate the compounds are pentachlorophenylbenzene sulfonate, pentachlorophenyl-p-toluene sulfonate and tris(pentachlorophenyl) phosphate. The compound pentachlorophenyl propargyl ether is representative of the compounds obtained where R is an alkynyl. Where R is selected from the group consisting of —H·$R_1$ and $R_1$ is selected from the group consisting of monohydroxy alkyl amines and N-containing heterocyclics, the compounds represented by the monohydroxy alkyl amines are the following salts of pentachlorophenol: dimethylisopropanolamine, 2-(isopropyl)-ethanolamine, N-ethyl ethanolamine and dibutylamino. Where $R_1$ is selected from the N-containing heterocyclic group, the compounds are the following salts of pentachlorophenol: quinoline, 8-hydroxy quinoline, and pyridine.

The examples presented below are illustrative of the method of preparing the novel compounds of this invention and of the compositions and the concentrations employed but are not to be construed as limiting the invention thereto.

Derivatives of pentachlorophenol where R is selected from the group consisting of carbamyls:

Example I

The compound pentachlorophenyldimethyl carbamate is prepared by adding 18.5 grams (0.172 mol) of dimethyl carbamyl chloride with stirring, to 40.0 grams (0.150 mol) of pentachlorophenol in 100 ml. of pyridine while maintaining the reaction temperature below 30° C. The mixture is heated to the boiling point of pyridine (115° C.) for about 30 minutes. Following this, the mixture is cooled and the liquid is poured into water to obtain a white solid precipitate which is thereafter washed with 5% sodium carbonate, filtered and recrystallized from ethanol. The yield is 45.1 gms. (89.2%) of a solid melting at 149–151° C. The product is analyzed and the following is obtained: Calculated for $C_9H_6Cl_5NO_2$: 32.10% C, 1.79% H, and 4.15% N. Found: 32.26% C, 1.72% H, and 4.11% N.

Derivatives of pentachlorophenol where R is selected from the substituted aryl carboxy groups:

Example II

The compound pentachlorophenyl-p-nitrobenzoate is prepared by adding 18.3 gms. (0.099 mol) of p-nitrobenzoyl chloride with stirring to 25.0 gms. (0.094 mol) of pentachlorophenol in 100 ml. of pyridine. The mixture is warmed slightly for a period of 15 minutes and thereafter poured into water to obtain a white precipitate which is washed with 5% sodium carbonate, filtered and recrystallized from ethanol. The yield is 30.0 gms. (76.9%) of a solid melting at 187–189° C. The product is analyzed and the following is obtained: Calculated for $C_{13}H_4Cl_5NO_4$: 37.59% C, 0.97% H, and 3.37% N. Found: 37.12% C, 1.14% H, and 3.59% N.

Example III

The compound pentachlorophenyl-p-chlorobenzoate is prepared by adding 15.0 ml. (0.118 mol) of p-chlorobenzoyl chloride with stirring to 30.0 gms. (0.113 mol) of pentachlorophenol in 95 ml. of pyridine. The reaction mixture is heated slightly for a period of 15 minutes and is then poured into water to obtain a solid precipitate which is thereafter washed with 5% sodium carbonate at which point the solid is converted to an oil. The oil is extracted with ether and dried over anhydrous calcium chloride. The ether is then removed and a solid is obtained which is then recrystallized from an isopropanol-water mixture. The yield is 28.0 gms. (61.2%) of a solid melting at 104° C. The product is analyzed and the following is obtained: Calculated for

36.9% C, 1.43% H, and 50.4% Cl. Found: 36.2% C, 1.44% H, and 50.5% Cl.

Derivatives of pentachlorophenol where R is selected from the aryl sulfonate and phosphate groups:

Example IV

The compound pentachlorophenylbenzene sulfonate is prepared by adding 13.0 gms. (0.074 mol) of benzene sulfonyl chloride with stirring to 20.0 gms. (0.075 mol) of pentachlorophenol in 80 ml. of pyridine while maintaining the temperature below 30° C. The mixture is allowed to stand for 2 hours and is then poured into water, filtered, washed with 5% sodium carbonate and recrystallized from ethanol. The yield is 23.5 gms. (78.6%) of a solid melting at 158–158.5° C. The product is analyzed and the following is obtained: Calculated for $C_{12}H_5Cl_5O_3S$: 35.50% C, 1.24% H, and 7.89% S. Found: 35.40% C, 1.59% H, and 7.95% S.

Example V

The compound pentachlorophenyl-p-toluene sulfonate is obtained by adding 15.0 gms. (0.079 mol) of p-toluene sulfonyl chloride with stirring to 20.0 gms. (0.75 mol) of pentachlorophenol in 100 ml. of pyridine while maintaining the temperature below 30° C. The mixture is allowed to stand for 2 hours and is then poured into"

water, filtered, washed with 5% sodium carbonate and recrystallized from ethanol. The yield is 25.0 gms. (79.1%) of a solid melting at 157–158° C. The product is analyzed and the following is obtained: Calculated for $C_{13}H_7Cl_5O_3S$: 37.13% C, 1.68% H, 42.2% Cl, and 7.62% S. Found: 37.50% C, 1.83% H, 42.9% Cl, and 7.41% S.

*Example VI*

The compound tris(pentachlorophenyl) phosphate is prepared by adding 6.5 gms. (0.042 mol) of phosphorous oxychloride with stirring to 26.6 gms. (0.100 mol) of pentachlorophenol in 110 ml. of pyridine while maintaining the temperature at 15–20° C. The mixture is refluxed for 1 hour after which time the liquid is evaporated to ⅓ its original volume. After cooling, the mixture is poured into water and the solid precipitate and is obtained is washed with 5% sodium carbonate, filtered and recrystallized from an ethanol-water mixture. The yield is 7.8 gms. (70.4%) of a solid that decomposes at a temperature of 322–326° C. The product is analyzed and the following is obtained: Calculated for $C_{18}Cl_{15}O_4P \cdot 4H_2O$: 23.6% C, 0.89% H, and 58.2% Cl. Found: 22.7% C, 0.87% H, and 56.0% Cl.

Derivatives of pentachlorophenol where R is selected from the group —$H \cdot R_1$ and $R_1$ is a monohydroxyalkylamine:

*Example VII*

The dimethylisopropanolamine salt of pentachlorophenol is prepared by adding 11.6 gms. (0.112 mol) of dimethylisopropanolamine to a mixture of 30.0 gms. (0.112 mol) of pentachlorophenol in 25 gms. of isopropanol and heating the reaction mixture at approximately 40° C. for 1 hour. The isopropanol is then evaporated and a crude solid is obtained which is recrystallized from water. The yield is 35.8 gms. of a solid melting at 132.5–134° C. Partial evaporation of the water yields an additional 4.0 gms. melting at 133.5–134.5° C. (total yield is 70.7%). The higher melting product is analyzed and the following is obtained: Calculated for $C_{11}H_{14}Cl_5NO_2$: 35.8% C, 3.82% H, and 3.80% N. Found: 35.6% C, 3.91% H, and 3.74% N.

*Example VIII*

The 2-(isopropyl)-ethanolamine salt of pentachlorophenol is prepared by adding 10.3 gms. (0.100 mol) of isopropylaminoethanol to a mixture of 26.6 gms. (0.100 mol) of pentachlorophenol in 25 gms. of isopropanol. After the initial heat of reaction the mixture is heated at approximately 40° C. for 1 hour, cooled and filtered, and the crude product recrystallized from water. The yield is 31.1 gms. (84.7%) of a solid melting at 151.5–153.5° C. The product is analyzed and the following is obtained: Calculated for $C_{11}H_{14}Cl_5NO_2$: 35.75% C, 3.82% H, and 48.0% Cl. Found: 35.72% C, 3.89% H, and 48.6% Cl.

*Example IX*

The N-ethyl ethanolamine salt of pentachlorophenol is prepared by adding 8.9 gms. (0.100 mol) of N-ethyl ethanolamine to a mixture of 26.6 gms. (0.100 mol) of pentachlorophenol in 25 gms. of isopropanol. When the initial heat of reaction has subsided, the mixture is heated at approximately 40° C. for 1 hour, cooled and filtered, and the crude product recrystallized from water. The yield is 24.8 gms. of a solid melting at 139–141° C. Partial evaporation of the solvent yields an additional 2.4 gms. of product melting at 138.5–140° C. (total yield is 76.6%). The higher melting product is analyzed and the following is obtained: Calculated for $C_{10}H_{12}Cl_5NO_2$: 33.8% C, 3.38% H, and 49.9% Cl. Found: 33.8% C, 3.54% H, and 49.7% Cl.

*Example X*

The dibutylaminoethanol salt of pentachlorophenol is prepared by adding 19.5 gms. (0.112 mol) of dibutylaminoethanol to a mixture of 30.0 gms. (0.112 mol) of pentachlorophenol in 600 ml. of boiling n-hexane. Upon cooling, a viscous oil separates out of the solution. The n-hexane is decanted and the oil is washed with more n-hexane to obtain 48.1 gm. (97.2%) of a viscous oil. The product is analyzed and the following is obtained: Calculated for $C_{16}H_{24}Cl_5NO_2$: 43.70% C, 5.50% H, and 3.19% N. Found: 44.03% C, 5.49% H, and 3.42% N.

Derivatives of pentachlorophenol where R is selected from the group —$H \cdot R_1$ and $R_1$ is an N-containing heterocyclic:

*Example XI*

The 8-hydroxyquinoline salt of pentachlorophenol is prepared by adding 16.3 gms. (0.112 mol) of 8-hydroxyquinoline in 100 ml. of benzene to a mixture of 30.0 gms. (0.112 mol) of pentachlorophenol in 500 ml. of benzene. The benzene is evaporated to ½ its original volume, cooled to 10° C. and the solid that precipitates is collected and recrystallized from benzene. The yield is 32.5 gms. (70.4%) of a solid melting at 112.5–113.5° C. The product is analyzed and the following is obtained: Calculated for $C_{15}H_8Cl_5NO_2$: 43.75% C, 1.96% H, and 3.41% N. Found: 43.95% C, 1.84% H, and 3.87% N.

*Example XII*

The quinoline salt of pentachlorophenol is prepared by adding 17.0 gms. (0.131 mol) of quinoline in 100 ml. of benzene to a mixture of 35.0 gms. (0.131 mol) of pentachlorophenol in 400 ml. of benzene. The benzene is evaporated to ½ its original volume, cooled to 7° C. to obtain a solid precipitate which is collected, dried and recrystallized from n-hexane. The yield is 35.8 gms. (72.3%) of a solid melting at 113° C. The product is analyzed and the following is obtained: Calculated for $C_{15}H_8Cl_5NO$: 45.55% C, 2.04% H, and 3.54% N. Found: 45.73% C, 1.88% H, and 3.56% N.

*Example XIII*

The pyridine salt of pentachlorophenol is prepared by adding 10.0 gms. (0.126 mol) of pyridine in 25 ml. of petroleum ether to a mixture of 30.0 gms. (0.112 mol) of pentachlorophenol in 500 ml. of petroleum ether. The mixture is heated at 42° C. for 15 minutes and filtered while hot. A solid is collected and recrystallized from ligroin. There is obtained 15.4 gms. of a material melting at 85.5–87° C. from the ligroin, while from the petroleum ether there is obtained 11.3 gms. of a material melting at 90–91° C. These two batches are combined and recrystallized from ligroin and 26.7 grams of a purified and unstable product are obtained melting at 88–90° C.

Derivatives of pentachlorophenol where R is selected from the alkynyl group:

*Example XIV*

The compound of pentachlorophenyl propargyl ether is prepared by adding 66.6 gms. (0.250 mol) of pentachlorophenol and 5.75 gms. (0.250 mol) of sodium in 250 ml. of ethanol to 31.6 gms. (0.266 mol) of propargyl bromide in 30 ml. of ethanol. The mixture is placed in a flask equipped with a condenser, stirrer and drying tube and refluxed with a stirring for 1½ hours. The mixture is then allowed to cool and the white crystals which are formed are filtered, washed with ethanol, then with 500 ml. of water containing 0.5 gm. of sodium hydroxide, and then with water and dried. The yield is 58.0 gms. of white needles melting at 141–142° C. Evaporation of the ethanol mother liquor to about ½ its original volume gives 3.9 gms. of off-color white needles melting at 141–142° C. The total yield is 87.0%. The product is analyzed and the following is obtained: Calculated for $C_9H_3Cl_5O$: 35.5% C, 0.99% H, and 58.2% Cl. Found: 35.3% C, 1.06% H and 58.6% Cl.

The novel compounds of this invention, as set forth above, can be prepared generally by the procedures described in the examples. The compounds of this invention find many uses of which the field of biological activity is an example. Thus, in the fungicidal field, the compounds shown fungicidal activity as will be illustrated below.

In the fungicidal evaluation test, the compound is suspended or dissolved in distilled water at concentrations of 1000, 100, 10 (and even less) parts per million for the spore germination test on slides, and 2000 parts per million and less for evaluation of its ability to protect tomato plants against infection by the early blight fungus *Alternaria solani*. In these tests, the compound is first dissolved in 5% acetone solution containing an emulsifier, i.e., Triton X–155 (alkyl aryl polyether alcohol) at about 0.01% concentration. In the spore germination test on glass slides the compound at 1000 parts per million is tested for its ability to inhibit germination of spores from 7 to 10 day old cultures of *Alternaria oleracea* and *Sclerotinia fructicola*. In the tomato foliage test, the plants (var. Bonny Best) are sprayed with 100 ml. of the test formulation at 2000, 400 and 80 parts per million at 40 pounds air pressure. To illustrate generally the effect of the novel compounds of this invention in the field of biological activity the following examples are offered:

Example XV

The novel compounds pentachlorophenyldimethyl carbamate and pentachlorophenyl-p-nitrobenzoate are tested for fungicidal activity in a slide germination test to spores of *Alternaria oleracea* and *Sclerotinia fructicola*. The compounds inhibit at least half the fungus spores in concentrations of 100 parts per million.

Example XVI

The compound pentachlorophenyl-p-chlorobenzoate is tested for fungicidal activity in a slide germination test to spores of *Alternaria oleracea* and *Sclerotinia fructicola*. Such tests show that the compound inhibits at least half of the fungus spores in concentrations of 10 parts per million in the solution applied.

At the concentrations of 2000 and 400 parts per million on the tomato foliage test, the compound kills the plants although at concentrations of 20 parts per million it is not phytotoxic. The compound does not exhibit phytotoxicity on corn plants when 250 mgs. of the chemical are applied to the soil in a 4½ inch clay pot, and it therefore has an additional use as a selective herbicide to control broad leaf plants.

Example XVII

The compound pentachlorophenylbenzene sulfonate and pentachlorophenol-p-toluene sulfonate are tested for fungicidal activity as in Example XV above. These tests show that the compounds inhibit at least half of the fungus spores in a concentration of 1000 parts per million of the solution applied.

Example XVIII

The compound tris(pentachlorophenyl) phosphate is tested for fungicidal activity as in Example XV above. The tests show that the compound inhibits at least half of the fungus spores in a concentration of 100 parts per million in the solution applied.

The compound is sprayed as an acetone emulsion, containing Triton X–155, on 4 week old tomato plants (var. Bonny Best) afflicted with early blight (*Alternaria solani*). Using a concentration of 2000 parts per million the inhibition of the blight by the fungicide is 54% thus indicating fungicidal activity.

This novel compound in addition to its fungicidal properties is also useful as a plasticizer and as a flameproofing plasticizer.

Example XIX

The compounds from the amine and the N-containing heterocyclic groups are tested for fungicidal activity in slide germination tests to spores of *Alternaria oleracea* and *Sclerotinia fructicola*. These tests show that the compounds inhibit at least half of the fungus spores in an amount of 10 parts per million. These compounds are phytotoxic to the plants when used in concentrations of over 20 parts per million and thus also exhibit herbicidal properties.

Example XX

The compound pentachlorophenylpropargyl ether is tested for fungicidal activity as in Example XV above. These tests show that the compound inhibits at least half of the fungus spores in a concentration of 1000 parts per million in the solution applied.

The compound is sprayed as an acetone emulsion (containing Triton X–155) on 4 week old tomato plants (var. Bonny Best) afflicted with early blight (*Alternaria solani*). Using concentrations of 400, 80 and 16 parts per million the inhibition of the blight by the fungicide is 59, 67 and 34 percent respectively, thus exhibiting fungicidal activity.

Although the novel compounds of this invention have been described with reference to their fungicidal activity they can also be employed in a variety of compositions depending, of course, on the nature of the application desired. Thus, they may be used in any conventional manner, for example, foliage treatment compositions or can be applied to the soil by spraying, drenching and the like. The compounds can be formulated with other liquids and diluents, i.e., hydrocarbon oils, water and other solvents known in the art. The compounds of this invention can, in certain instances, be combined with other plant treating materials such as insecticides, miticides, defoliants and the like.

Having thus described this invention with reference to the new compositions of matter and the manner in which they may be prepared and used, it is intended to cover all modifications that fall within the spirit of the invention and the scope of the appended claim.

What is claimed is:

Pentachlorophenyl propargyl ether.

References Cited in the file of this patent

UNITED STATES PATENTS

| | | |
|---|---|---|
| 2,107,650 | Smith et al. | Feb. 8, 1938 |
| 2,327,338 | Carswell | Aug. 24, 1943 |
| 2,382,976 | Coleman | Aug. 21, 1945 |
| 2,401,261 | MacMullen | May 28, 1946 |
| 2,430,017 | Houk | Nov. 4, 1947 |
| 2,542,604 | Weisel et al. | Feb. 20, 1951 |
| 2,615,823 | Lawlor et al. | Oct. 28, 1952 |
| 2,641,578 | Weisel | June 9, 1953 |
| 2,666,039 | Reid et al. | Jan. 12, 1954 |

OTHER REFERENCES

Weinman et al.: 40 Jour. Econ. Entomol. (1947), page 76 (1 page).

Kenega et al.: Jour. Econ. Entomol., vol. 42 (1949), pages 996–97 (2 pages).

Le Fave: Butler Univ. Botan. Studies, vol. 10, pages 101–7 (1952), as cited in 48 CA 5422.

Ikeda et al.: Jour. Sci. Research Instit., vol. 46, pages 185–7 (1953), as cited in 48 CA 6441.

P.B. Report, No. 588, Apr. 15, 1954 (3 pages).